(12) United States Patent
Hay et al.

(10) Patent No.: US 6,418,118 B1
(45) Date of Patent: Jul. 9, 2002

(54) NETWORK DEVICE INCLUDING SELECTIVE DISCARD OF PACKETS

(75) Inventors: Christopher Hay, South Harrow; Kam Choi, Tring; Patrick Gibson, London; Gareth E Allwright, St Albans, all of (GB)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/453,022

(22) Filed: Dec. 2, 1999

(30) Foreign Application Priority Data

Oct. 15, 1999 (GB) .............................................. 9924340

(51) Int. Cl.[7] .............................................. H04L 12/28
(52) U.S. Cl. ...................................... 370/230; 370/236
(58) Field of Search ................................. 370/229, 230, 370/231, 230.1, 232, 233, 234, 235, 235.1, 236, 252, 253, 395.4, 395.42, 395.43, 445

(56) References Cited

U.S. PATENT DOCUMENTS

| | | | |
|---|---|---|---|
| 4,630,259 A | | 12/1986 | Larson et al. |
| 5,444,706 A | * | 8/1995 | Osaki .......................... 370/230 |
| 5,953,335 A | * | 9/1999 | Erimli et al. ................ 370/390 |
| 5,999,515 A | * | 12/1999 | Ohashi ........................ 370/229 |
| 6,163,528 A | * | 12/2000 | Nagamoto ................... 370/236 |
| 6,252,849 B1 | * | 6/2001 | Rom et al. ................... 370/230 |

FOREIGN PATENT DOCUMENTS

| | | |
|---|---|---|
| WO | 95/18499 | 7/1995 |
| WO | 98/09408 | 3/1998 |

* cited by examiner

*Primary Examiner*—Ricky Ngo
(74) *Attorney, Agent, or Firm*—Nixon & Vanderhye P.C.

(57) ABSTRACT

A network device which includes flow control, being responsive to a control frame prescribing a pause in the forwarding of packet from a port, sorts received packets intended for forwarding from that port into a first queue, e.g. critical latency traffic and at least one other queue. A count of the number of packets in the first queue is determined at the onset of a pause and at least that number of packets are discarded from the first queue if the pause time exceeds a programmable reference.

5 Claims, 2 Drawing Sheets

NETWORK DEVICE INCLUDING SELECTIVE DISCARD OF PACKETS

FIELD OF THE INVENTION

This invention relates to packet-based data communication systems, particularly though not necessarily exclusively Ethernet networks and more particularly those conforming to IEEE Standard 802.3 (1998) Edition, or compatible with that Edition or subsequent revisions. The invention is concerned with the selective discard of packets in response to 'flow control' frames or their equivalent.

BACKGROUND OF THE INVENTION

As is well known in the art, data networks such as local area networks or wide area networks generally include a multiplicity of network devices, such as switches, routers, bridges and so on which have a multiplicity of ports on which data packets can be received and from which data packets can be forwarded. It is generally necessary or desirable for a network device to include storage space, such as a buffer memory, in which packets may be temporarily stored after they have been received and before they are forwarded from a relevant port or ports. In some devices there is packet storage space associated with the receiving section of each port and the transmitting section of each port; this memory space may be in addition to or in substitution for a common memory space. It is usually necessary to provide such memory space because, for example, owing to limitations of bandwidth, congestion, contention between packets or other reasons packets cannot be immediately dispatched from a network device after they have been received and any necessary processing of the packet has been performed. Such processing may include recourse to a forwarding database in order to determine the next hop on the route which the packet needs to take from its source to its ultimate destination. Since memory space either for the device in general or in relation to a particular port is necessarily limited, the device will, in order to avoid head of line blocking start discarding packets when memory space is not available.

One known method of avoiding packet loss is the technique known as 'flow control'. In the particular Standard mentioned above, flow control is defined as the sending of a particular control frame on a link to a device, the control frame including a globally assigned media access control address, an operation code and a selectable or controllable operand. The operation code defines a pause and the operand indicates the duration of the pause. When a device receives such a control frame at a port, it is inhibited from dispatching any ordinary data frames or packets (but not control frames) from that port to the originator of the flow control frame for a 'pause' time specified by the operand. In the particular Standard indicated above, control frames of this nature and the operations initiated by such control frames are described on pages 1206 to 1215 of IEEE Standard 802.3, 1998 Edition published by the Institute of Electrical and Electronic Engineers, Inc N.Y. 10017-2394, USA. It will be apparent that the invention is not limited to that particular Standard and may be employed generally in circumstances where a network device can be remotely inhibited from sending packets for some interval, whether adjustable or not, by means of some control frame or signal.

Flow control is normally used within network devices such as switches to achieve a lossless mode of operation. A device which is capable of responding to flow control normally contains substantial memory so that packets may be held in that memory space at least for the duration of the pause time. However, for certain types of traffic, particularly audio traffic such as voice messages, the variable delay to packets caused by the operation of flow control can be undesirable. For the sake of explanation, it is convenient to refer to 'latency critical' packets which may render a message difficult to understand or unintelligible if they are delayed unduly, typically beyond 10 or 20 milliseconds. It is probably better for such packets to be discarded rather than for a message to contain differentially delayed packets, that is to say packets with a different latency owing to the onset or cessation of flow control.

One proposal for dealing with the problem is the time stamping of packets. This may be achieved by defining, in a packet header, an age field, which may be a single or multi-bit field written according to the content of a clock driven counter. The artificial age which is written into the age field when a packet is received by a device may be compared at some suitable time, for example when the packet would otherwise be forwarded from the device, with the current age and the packet discarded if the age field does not correspond to the current age. Such a technique requires an operation on the receive packet, to write in the age field, and the provision of additional memory space to accommodate the time associated with the arrival of the packet.

The present invention is concerned with an improved system which provides for selective discard of packets, preferably according to traffic type, and avoids or renders unnecessary for this purpose the time stamping of individual packets.

SUMMARY OF THE INVENTION

The invention is based on the examination of the relevant data in headers of packets to sort the packets according to traffic type so that packets are stored in at least two groups, of which one group consists of packets of a particular type (e.g. having a critical latency) and the other group is composed of other packets. A count of packets in the first group is made at the onset of a pause. If the pause period is greater than some threshold or programmed interval, the number of packets specified in the count is discarded from the first group. It is generally preferable (and usual for other purposes) to organise the sorted groups of packets as queues. The selective discard provides space within the group (i.e. queue) for the acceptance of newly arrived traffic. Preferably, after the expiry of an interval, a new packet count is obtained so that packets that are still arriving during a pause period can continually be discarded to maintain the traffic flow into this queue.

It is preferable to examine data within a packet and to use, for example, layer ⅔ priorities to provide a basis for sorting the packets into a critical queue and at least one non-critical queue.

Further objections and features of the invention will be apparent from the detailed description that follows.

DETAILED DESCRIPTION

Figure 1:
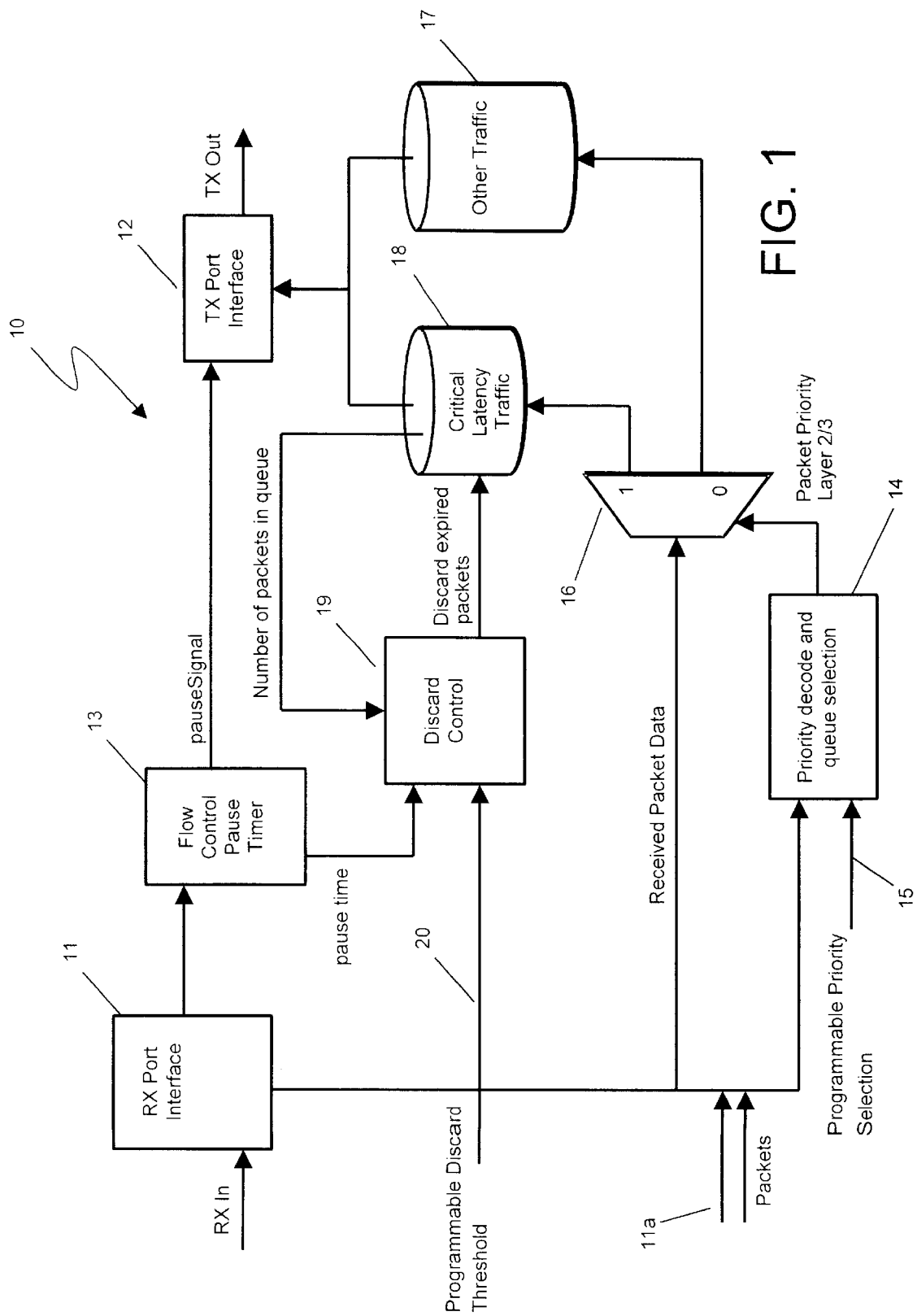
FIG. 1 illustrates one embodiment of the invention.

FIG. 1 illustrates the relevant part of a network device such as a switch 10. For the sake of simplicity, and particularly because the relevant features are not important to the invention, most of the features of the switch, such as all the ports except the port which has been illustrated, the main switching ASIC, and any incorporated data processor (CPU) have been omitted.

The switch 10 is shown as including, for a particular port, a receive port interface 11, a transmit port interface 12 and a flow control pause timer 13. These features are well known features of switches. Basically, receive port interface 11 receives packets over a link connected or coupled to the relevant port and the transmit port interface 12 is capable of forwarding packets out on that link. When the RX port interface 11 receives a flow control frame such as the specific MAC control frame previously discussed, a known flow control pause timer 13 signals the transmit port interface 12 to prevent the transmission of frames from the port for the time specified in the flow control frame.

Packets received at the receive port interface 11 are snooped by means of a priority decode and queue selection function 14 which has a programmable control on a line 15. Selection function 14 operates a demultiplexer 16 interposed between the interface 11 and the main memory which is shown as divided into two parts, 17 and 18. The selection function 14 serves to sort the input packets according to protocol or priority into packets which have a critical latency, stored in memory space 18, and other packets, which are stored in memory space 17. The criteria for selection and the particular selection is determined by the programmable priority control, which may be remotely operated by, for example, a network administrator.

The memory spaces 17 and 18 will normally store packets which enter the switch 10 by way of other ports. Such ports are indicated diagrammatically by lines 11a.

The switch as thus far described has individual elements which are known in the art. It is known practice, albeit for other purposes, to select traffic using, for example, layer 2/layer 3 priorities. The memory spaces 17 and 18 may of course form part of a single dynamic random access memory, the different memory spaces 17 and 18 being controlled by appropriate addressing determined by the demultiplexer 16 and address or associated data within packets.

In structural terms the improvement provided by the present invention is a discard control 19 which has several functions. It responds to the onset of flow control, preferably by way of a signal from the pause timer 13, to capture a count of the number of packets in the relevant memory space 18 at that time. It makes a determination of whether the pause time set in the timer 13 exceeds a reference denoting a programmable discard time and defined by a signal on a line (in practice a multiplicity of lines) 20. Furthermore, if the pause time prescribed for the port is greater than the threshold, the number of packets specified in the 'captured' count is discarded from the memory space 18. It will be understood that since all those packets will have been received by the switch before the onset of the pause time they will necessarily have been 'aged' for an interval greater than the programmable discard threshold before they can be forwarded from the port. Thus these packets are automatically 'aged' and are discarded.

Figure 2:
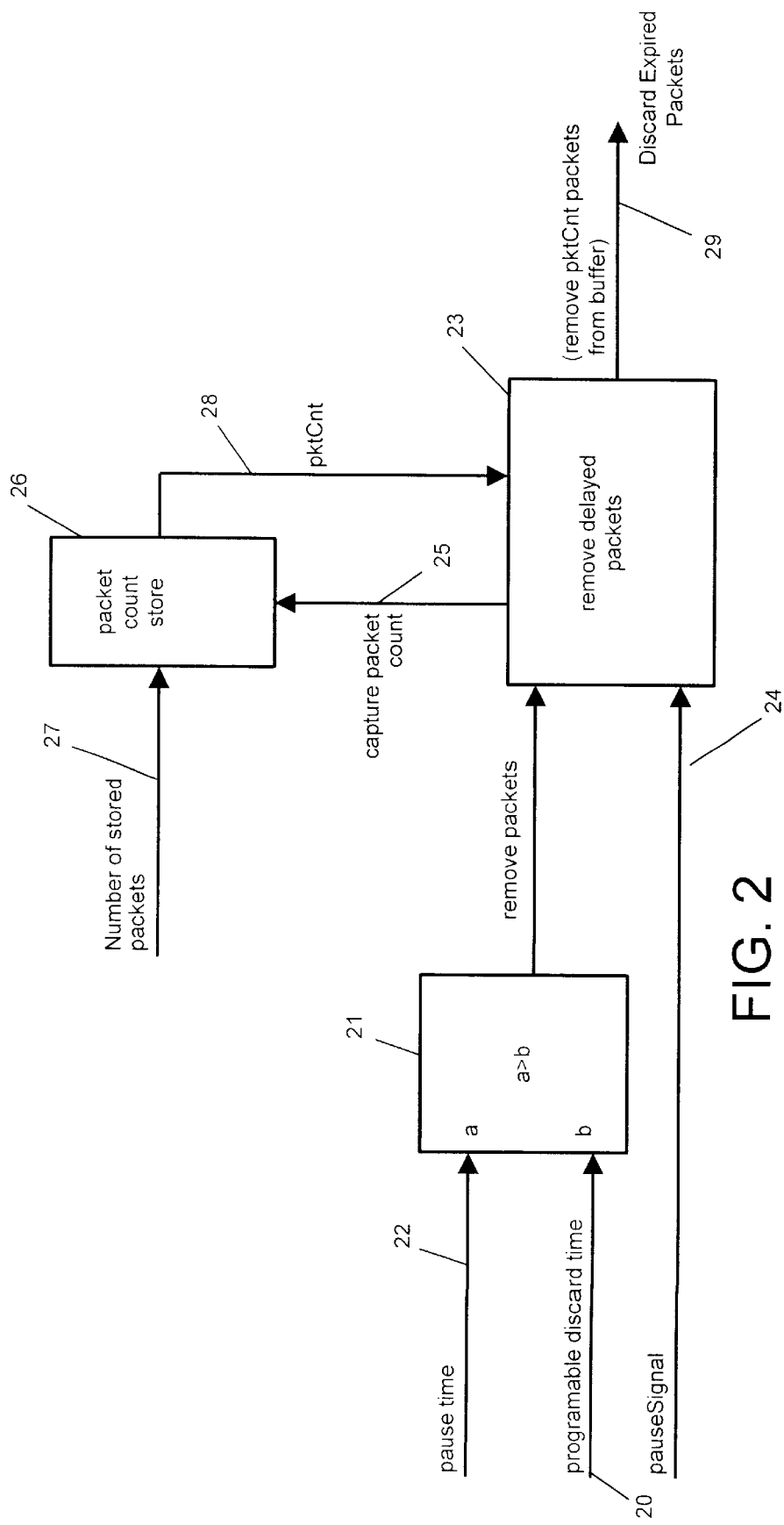
FIG. 2 illustrates part of the embodiment in greater detail.

These functions may be provided as shown in FIG. 2, which illustrates one example of the discard control 19. A comparator 21 compares a pause time signal on a line 22 with the programmable discard time on the line 20. If the 'pause time' signal exceeds the 'programmable discard time' signal (shown as 'a>b'), a 'remove packets' signal is sent to the 'remove delayed packets' functional block 23, preferably along with the 'pauseSignal' on line 24. In response a 'capture packet count' signal is sent on line 25 to a 'store' 26 which contains at any time an indication of the packet count of critical latency traffic in the memory space 18. The store 26 obtains its count on line 27 coupled to memory space 18, and provides a 'pktCnt' signal indicating the number of stored packets to block 23, which provides on line 29 a command 'remove pktCnt packets from buffer' to a control (not explicitly shown) for buffer memory 18.

Since a queue of packets in a memory is usually defined by means of address pointers, the indications of the number of packets in a queue and the deletion of packets in a queue defined by pointers are operations known in the art and do not require detailed description.

The discard control 19 may operate so that after every 'critical' interval (i.e. each 10-20 ms.) has expired after the initiation of the pause, a new packet count is taken so that packets that are still arriving during a pause period, and should be deemed to have expired by the end of that pause period, can continually be discarded in response to the 'remove packets' signal and 'pauseSignal', in order to maintain the traffic flow into the queue in the buffer space 18. This will help to reduce or delay the onset of congestion.

What is claimed is:

1. A network device for use in a packet-based data communication system, said device including means for receiving data packets, means for forwarding data packets from at least one port, means responsive to a control frame initiating a pause and defining a pause time to inhibit forwarding of said packets from said port, and memory space for the storage of packets before they are forwarded from said port, said switch further comprising:

means for sorting received packets into a first group and a second group; and control means responsive to the initiation of a pause to compare said pause time with a reference and to determine a count of packets in said first group, said control means causing discard of said number of packets from said first group when said pause time exceeds said reference.

2. A device according to claim 1 wherein said reference denotes a programmable discard time.

3. A device according to claim 1 wherein the means for sorting comprises means for storing said received packets in respective queues according to a programmable criterion.

4. A device according to claim 3 wherein the means for sorting includes means for examining priority and protocol data in said received-packets.

5. A network device including: at least one port for the reception and forwarding of data packets; means responsive to a control frame which initiates a pause and defining a pause time to inhibit forwarding of said packets from said port; memory space for the storage of data packets before they are forwarded from said port; means responsive to data in said packets to sort said packets into a first group and a second group; means providing a count of the number of packets in said first group; control means responsive to the initiation of said pause for comparing said pause time with a reference and means for causing discard of at least said number of packets in said first group when said pause time exceeds said reference.

* * * * *